United States Patent [19]

Ow

[11] Patent Number: 4,773,618
[45] Date of Patent: Sep. 27, 1988

[54] HIGH SPEED VERTICAL TAKE-OFF AND LANDING AIRCRAFT

[76] Inventor: Gordon J. W. Ow, 700 East Ocean Blvd., #1604, Long Beach, Calif. 90802

[21] Appl. No.: 5,696

[22] Filed: Jan. 21, 1987

[51] Int. Cl.$^4$ .................... B64C 29/00; B64C 39/06
[52] U.S. Cl. .................................................. 244/23 C
[58] Field of Search ............... 244/23 C, 23 R, 12.1, 244/12.2, 73 C, 17.11, 23 B, 23 D; 416/20 R, 20 A

[56] References Cited

U.S. PATENT DOCUMENTS

| | | | |
|---|---|---|---|
| 2,667,226 | 1/1954 | Doblhoff | 416/20 R |
| 2,863,621 | 12/1958 | Davis | 244/23 C |
| 2,988,152 | 6/1961 | Katzenberger et al. | 416/20 R |
| 3,182,929 | 5/1965 | Lemberger | 244/23 C |
| 3,327,969 | 6/1967 | Head | 416/20 R |
| 3,514,053 | 5/1970 | McGuinness | 244/12.2 |

*Primary Examiner*—Galen Barefoot
*Assistant Examiner*—Rodney Corl
*Attorney, Agent, or Firm*—King and Schickli

[57] ABSTRACT

A high-speed vertical take-off and land (HSVTOL) aircraft comprises a disk-shaped body with a annular rotor having a rotatable fan assembly driven by redirected jet exhaust gases. The rotatable fan assembly includes fan blades, each with movable airfoil portions, and stationary flap portions with nozzles located on the trailing edges. Low pressure inflatable O-ring seals and bearings are positioned along a labyrinth interface between the disk-shaped body and the rotor. The rotatable fan assembly of the rotor is connected to an annular plenum receiving the hot exhaust gases. For vertical flight, substantially all of the hot exhaust gases of the turbojet engines are redirected into the plenum by main bypass and control bypass doors. Converging ducts located in the rotor just upstream of the rotatable fan assembly receive and direct the hot exhaust gases from the plenum to radially extending feed tubes connected to the nozzles. The rotor rotates about the disk-shaped body by the reaction force created from the emission of the exhaust gases from the nozzles. Lift of the aircraft is principally provided by the action of the fan assembly; but also by the reaction force of the hot gas from the nozzles. The primary lift force in vertical flight comes from opening the movable airfoil portion of the blades scooping ambient air into the fan assembly and causing a downwash past the stationary flap portions, which in turn provides lift. The pitch of the movable airfoil portions of the fan blades may be changed to modulate the lift. For horizontal flight, the movable airfoil portions are gradually closed to create an aerodynamic, low drag disk. The bypass doors within the jet engines are opened to allow normal jet operation and cut off flow to the fan assembly. Sufficient rotational velocity of the fan assembly is maintained during horizontal flight to maintain gyroscopic stablility. Gyroscopic attitude control is achieved through all phases of aircraft flight, both vertical and horizontal. Specifically, eyeball valves are selectively and cyclically operated to regulate the hot exhaust gases being ejected from the nozzles along the lower edge of the blades causing the aircraft to pitch and roll, as required.

15 Claims, 6 Drawing Sheets

HIGH SPEED VERTICAL TAKE-OFF AND LANDING AIRCRAFT

BACKGROUND OF THE INVENTION

The present invention relates to aircraft, and more particularly to an aircraft with vertical take-off and landing (VTOL) capabilities and high speed (HS) horizontal flight.

As is well known, conventional high speed winged aircraft require long runways for take-offs and landings. There are many significant disadvantages to the long runways required for take-off and landing. One such disadvantage is the vulnerability of air bases in combat zones. By simply destroying a portion of the runway, an enemy can effectively shut down an air base. This could have catastrophic effects since it removes the ability to attack from this location, often prevents those at the air base from leaving and stops incoming supplies.

Another significant military disadvantage is that conventional runways are costly and require considerable time to construct and, thus, most air bases are constructed a considerable distance from the battlefront. For this reason, considerable time and expense is required merely to fly the aircraft to the combat area.

With the need for a runway for take-off and landing, conventional aircraft must line up and wait to take off or land thus resulting in significant wastes of time in both military and domestic air travel.

Conventional aircraft are also susceptible to delays in inclement weather conditions as a direct result of the runway requirement. Traffic control is much more difficult, and snow and ice can even cause extended shutdowns of the runways.

With regard to domestic air travel, the noise created by and clearance required by ascending and descending aircraft has forced airports to be built considerable distances from the metropolitan areas that they serve. The large areas of land required for constructing the long take-off and landing runways have also forced airports to be constructed away from the metropolitan areas. In many cases, the metropolitan area has expanded to encompass the airport thus restricting growth of the airport as well as creating serious safety and health concerns.

Of course, the conventional helicopter, with its vertical takeoff and landing capabilities, overcomes these problems, but is not without its own shortcomings. Presently, helicopters are significantly restricted in their range capabilities. Helicopters also suffer generally severe payload restrictions compared to winged aircraft; and furthermore, fly at substantially less horizontal speeds than winged aircraft due to the greater aerodynamic drag created by their design.

Numerous schemes for vertical take-off and landing aircraft have been devised in an attempt to increase the horizontal speed capability. One such scheme is to have the aircraft take off in a vertical attitude similar to the Space Shuttle, and then rotate to a horizontal attitude for high speed flight. Another design is to allow the aircraft to take off and land in a horizontal attitude by providing separate engines for vertical and horizontal thrust. Take-off and landing in the horizontal attitude has also been obtained using the same engine for vertical and horizontal flight by vectoring the hot exhaust gases; i.e. either rotating the engine or redirecting the engine thrust. Several examples of existing designs for high speed vertical take-off and land (HSVTOL) aircraft as described, are the Vought TF-120, McDonnell Douglass 279-3 and General Dynamics E-7. In each case, the lift for vertical flight is obtained exclusively from the reaction force of the vectored exhaust gases.

Thus, although there are presently a relatively large number of HSVTOL designs, the prototype of these aircraft have not fully overcome the range, payload and speed shortcomings of the conventional helicopters. Furthermore, these HSVTOL or rotorcraft aircraft are not without their own inherent problems. One problem is that the thrust required for vertical take-off is more than twice the thrust needed for a conventional aircraft and, thus, the engines required are substantially twice as heavy with high fuel consumption, and are expensive to purchase and maintain. Some designs have proposed additional thrust while minimizing expense by utilizing afterburners. However, afterburners create a very hot exhaust which can shorten engine life and harm landing pad surfaces. Additionally, the heat from the exhaust is sometimes reflected upward and is sucked back into the engine causing a loss of power.

Another problem with current HSVTOL designs is the lack of efficient attitude control of the aircraft during both vertical and horizontal flight. The most widely used method to control the attitude presently is a pure reaction control system wherein the exhaust nozzle of the jets is simply moved. This redirects the hot exhaust gas in the manner necessary to pitch and/or roll the aircraft. Usually, this control system is coupled with a separate system of small, compressed air control jets. Because of the lack of stability of these prior aircraft, both are usually required. This increases the cost of the aircraft and is generally inefficient.

In order to attain vertical flight with current HSVTOL aircraft utilizing the reaction jets as described, it is necessary to have the jet engines located as close as possible to the center of gravity. This design requirement greatly increases the control problems and the drag on the aircraft during horizontal flight. Finally, during take-offs and landing, the concentrated vertical stream of exhaust gases being expelled directly from the jet engines causes loose objects on the ground to kick up resulting in damage to the aircraft, commonly referred to as foreign object damage (FOD).

SUMMARY OF THE INVENTION

Accordingly, it is the primary object of the present invention to provide an improved vertical take-off and landing aircraft with enhanced control capabilities in both vertical and horizontal flight, and high-speed, low-drag capability in horizontal flight including supersonic speeds.

Another object of the present invention is to provide a HSVTOL aircraft with the range and payload capability comparable to horizontal take-off and land conventional aircraft.

Another object of the invention is to provide an HSVTOL aircraft with enhanced vertical take-off capabilities with positive attitude control without utilizing primarily downwardly directed hot exhaust gases.

Another object of the present invention is to provide a HSVTOL aircraft including a peripheral rotor including a fan assembly with operable fan blades to provide the primary upward lift during vertical flight and minimizing foreign object damage.

Still another object of the present invention is to provide a HSVTOL aircraft capable of control based on gyroscopic principles in all phases of flight.

Another object of the present invention is to provide a VTOL aircraft that is stabilized by gyroscopic action during both vertical and horizontal flight operations.

Still another object of the present invention is to provide a HSVTOL aircraft wherein attitude control is obtained by differential thrust from nozzles on rotating fan blades resulting in gyroscopic precession of the aircraft.

Another object of the present invention is to provide a VTOL aircraft that can efficiently perform vertical and horizontal operations in the same attitude and operate with a smooth transition between the two operations.

Additional objects, advantages and other novel features of the invention will be set forth in part in the description that follows and in part will become apparent to those skilled in the art upon examination of the following, or may be learned with the practice of the invention. The objects and advantages of the invention may be realized and attained by means of the instrumentalities and combinations particularly pointed out in the appended claims.

In order to achieve the foregoing and other objects, and in accordance with the purposes of the present invention as described herein, an improved aircraft particularly adapted for supersonic speed is provided with highly efficient vertical take-off and landing capabilities. In one aspect of the invention, a disk-shaped body is provided upon which jet engines are mounted. A feed duct extends from each of the jet engines into a plenum that receives and redirects the hot exhaust gases toward the outer periphery of the body. A rotor extends around the outer perimeter receiving the hot gases from the plenum.

The rotor includes a fan assembly having a plurality of airfoil-shaped blades which extend radially outward. Converging ducts in the rotor just upstream of the fan assembly receive the hot exhaust gases from the plenum for transfer to passages in the fan blades. The gases are then ejected from nozzles on the trailing edges of the fan blades. The emission of the hot exhaust gases from the nozzles provides the thrust for rotation of the fan assembly which in turn provides the lift for the aircraft in the vertical take-off/landing mode. Since the lift is primarily obtained by fan action, that is by the downwash of air causing lift on top of the fan blades, the adverse effects of using direct engine thrust, such as foreign object damage (FOD), suck down due to loss of power by the intake of hot exhaust gases and burning of the landing pad area, do not occur.

In another aspect of the invention, the fan blades include fixed and movable portions. The pitch of the movable portions may be varied in order to modulate the desired vertical lift. For horizontal flight, the movable portions of the fan blades are closed to create a low-drag, aerodynamic disk capable of supersonic speeds. Substantially all of the exhaust of the jet engines may be redirected through the engine exhaust nozzle to maximize the horizontal flight capability.

In a further specific aspect of the invention, valve means are provided for cyclically controlling the ejection of hot gases from the nozzles on the fan assembly providing attitude control of the aircraft. These valve means, preferably rotatable eyeball valves, are controlled by air actuated cams positioned in the quadrants around the periphery of the disk-shaped body. As the rotor rotates around the body, operating linkage activated by the cams cyclically controls the eyeball valves. The differential thrust provided by actuation of the valves provides gyroscopic precession of the aircraft axis. In accordance with gyroscopic principles, when the valves of one nozzle array are closed, the reduction in thrust in that particular quadrant coupled with the increased thrust in the other quadrants operates to provide a roll and/or pitch action in the quadrant spaced substantially 90 degrees therefrom.

The jet engines may be operated with differential thrusts in conjunction with reaction jet ports to provide the counter torque required to offset the spinning action of the rotor.

In still another aspect of the invention, main bypass and control bypass doors are provided in the jet engines to direct the hot exhaust gases into the feed duct and then into the plenum. Substantially all of the exhaust gases pass into the rotor and are ejected through the nozzle arrays on the fan blades providing maximum rotation to the rotor during the vertical operation sequences. The main bypass door closes first providing initial redirection of the gases and after the rotor picks up speed the control bypass door closes to provide for a smooth transition. Preferably, turning vanes are provided at the juncture between the feed duct and the jet engine nozzle to assist in redirection of the exhaust gases when the bypass doors are closed.

The rotor is connected to the disk-shaped body by a labyrinth seal that may include a low-pressure air-inflatable seal/bearing.

An outer ring on the rotor houses an operating crank and actuator for the movable airfoil portion of the fan blades. For maximum vertical lift, the airfoil portions are opened a maximum amount in order to increase the mass flow and velocity of the air. When open, the trailing section of the movable airfoil portion coincides with the upper surface of the stationary flap portion providing a highly efficient airfoil across the top of the entire fan blade. When closed, the movable blade portion seals the entire fan assembly area thus forming a low drag, aerodynamic surface across the entire upper surface of the disk-shaped aircraft.

Still other objects of the present invention will become readily apparent to those skilled in this art from the following description wherein there is shown and described a preferred embodiment of this invention, simply by way of illustration of one of the modes and alternative embodiments best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
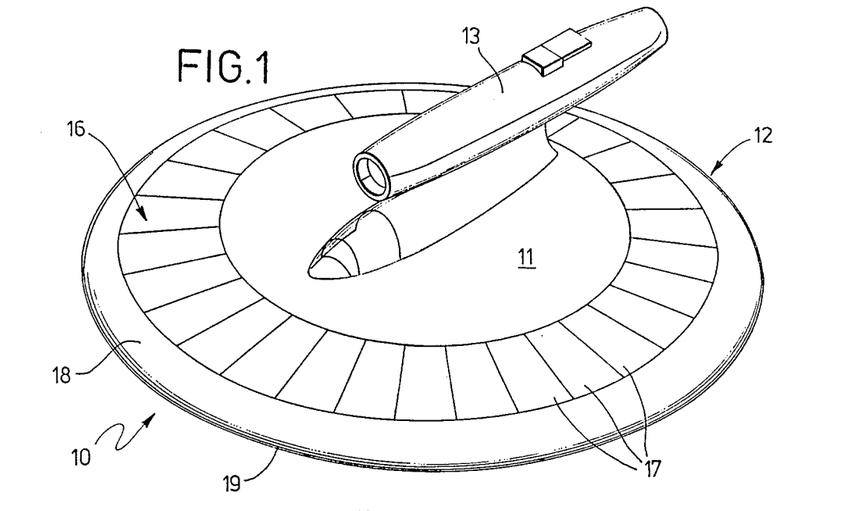
FIG. 1 is a perspective view of the vertical take-off and landing aircraft of the invention illustrating the aerodynamic design of the disk-shaped craft and with the fan assembly completely closed for horizontal flight.
Figure 2:
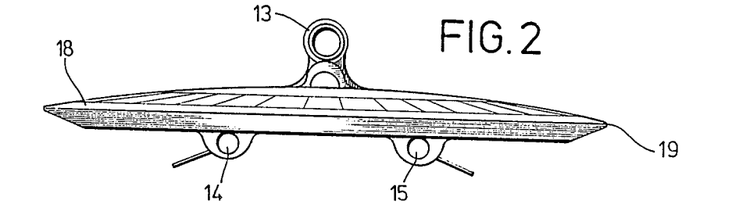
FIG. 2 is a front view of the aircraft of FIG. 1.

With reference now to FIG. 1 of the drawings, there is shown an aircraft 10, including a central, disk-shaped body 11 and an outer annular rotor 12. A turbojet engine 13 is mounted on top of the body 11. With reference to FIG. 2, a pair of jet engines 14, 15 may be mounted on the underside of the body 11.

Figure 3:
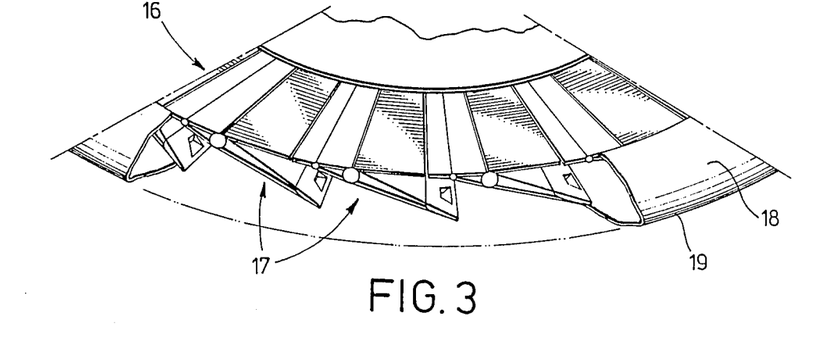
FIG. 3 is a partial, front perspective view of the aircraft of the invention with the outer ring of the rotor broken away along the leading edge to illustrate the position of the fan blades when closed.

As shown in FIG. 1, and as more clearly shown in FIG. 3, the rotor 12 includes an annular fan assembly 16 including a plurality of individual fan blades 17. In both FIG. 1 and FIG. 3, the blades are shown in the closed position providing a smooth upper surface of the aircraft 10 presenting a low drag, aerodynamic surface for efficient, high speed horizontal flight. An outer annular ring 18 presents an aerodynamic leading edge 19, also contributing to the efficient high speed horizontal flight (see also FIG. 2).

Figures 4, 5:
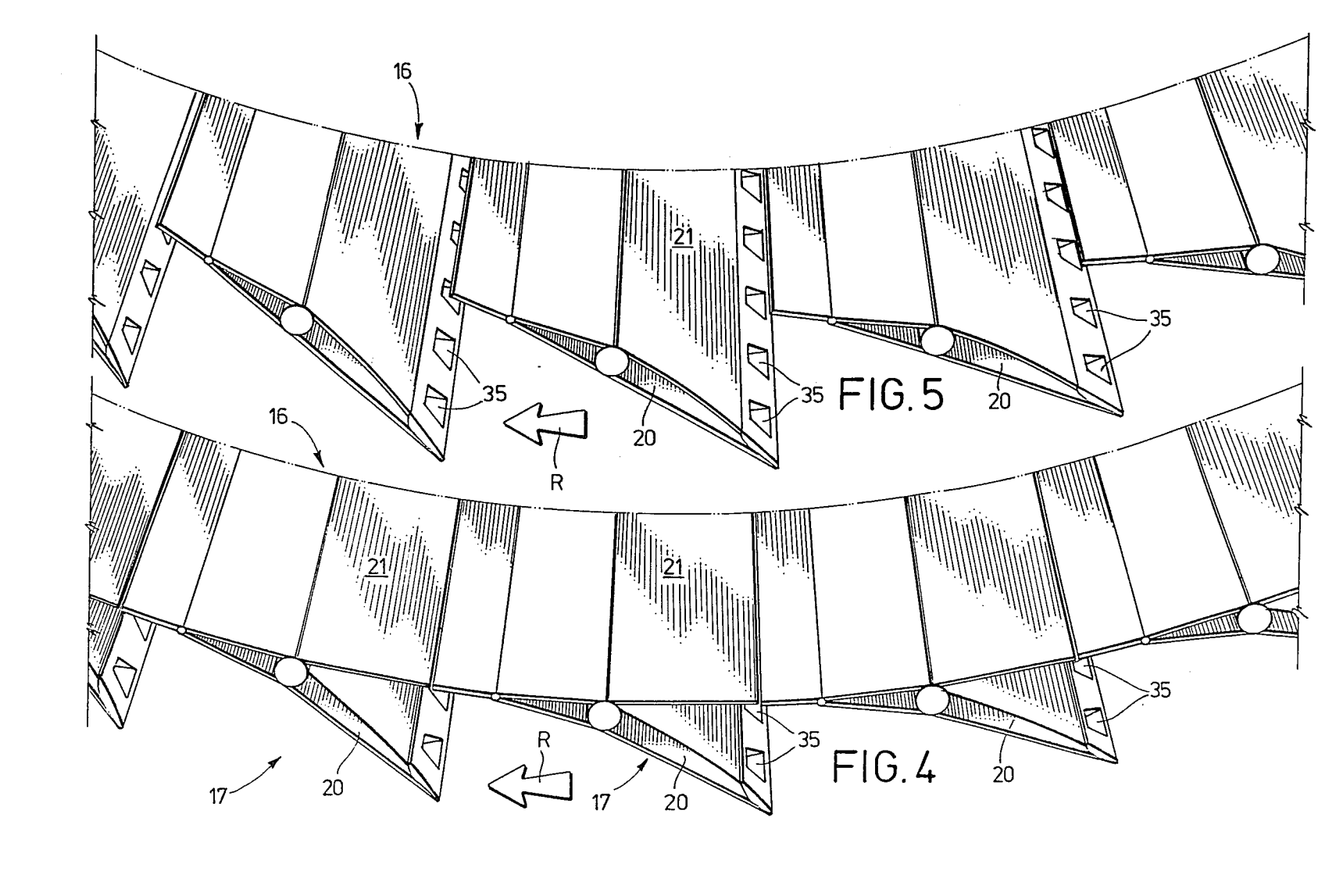
FIG. 4 is a much enlarged perspective view of the fan blades similar to that shown in FIG. 3 with the fan blades in the closed position and sealed along the upper surfaces of the aircraft.
FIG. 5 is a much enlarged view similar to FIG. 4 but with the fan blades shown in the open position for scooping ambient air into the fan assembly and providing lift as the air flows over the upper airfoil surface of the fan blades.
Figures 4A, 7:
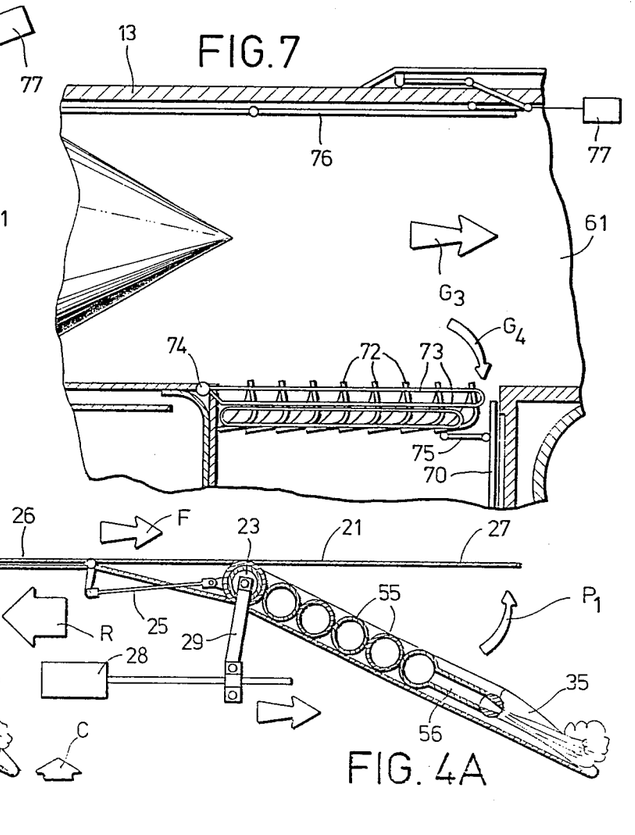
FIG. 4A is a cross-sectional view of the fan blade with the movable portion in the closed position.
FIG. 7 is an enlarged detail of the main and control bypass doors in the jet engine, positioned in the open position.

As best shown in FIGS. 4 and 4A, the individual fan blades 17 of the fan assembly 16 include a stationary flap portion 20 and a movable airfoil portion 21. In the closed position of the blades, the air flow is straight across the upper surface of the airfoil portion 21, as shown by the flow arrow F in FIG. 4A. As is evident in FIG. 4, this air flow F is thus not interrupted as it moves from the leading edge 19 back across the disk-shaped body 11. In this manner, the aerodynamic upper surface of the aircraft 10 is maintained for efficient flight in the horizontal or cruise mode. As will be more evident below, during this mode, the fan assembly does continue to rotate, but at a considerably reduced rotational velocity than that during vertical flight, as depicted by the rotation arrow R, selected to be in the clockwise direction of the preferred embodiment.

Figures 5A, 8:
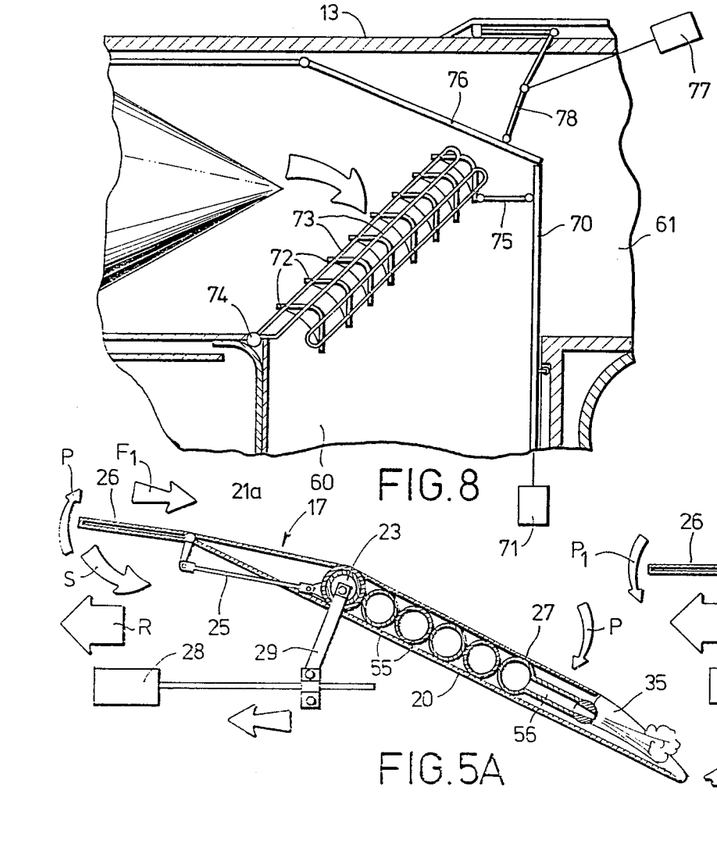
FIG. 5A is a cross-sectional view of the fan blade showing the movable airfoil portion in the raised or open mode.
FIG. 8 is an enlarged view of the main and control bypass doors in a closed position to direct the hot exhaust gases into the feed duct of the aircraft.

To switch the fan assembly to the maximum lift mode for vertical flight, the movable airfoil portion 27 is pivoted on the support shaft 23 in the direction of pivot arrows P (see FIG. 5A). This opening of the fan blades 17 allows ambient air along the upper aerodynamic surface to be scooped into the fan assembly 16, as shown by the arrow S in FIG. 5A. This scooping action causes downwash of the air and increased velocity air flow $F_1$ over the adjacent upper surface of the airfoil portion 21. This lift force thus provides the primary lift of the aircraft 10 in a unique and efficient manner.

Secured to the support shaft 23 is a fixed linkage 25 that provides a slight downward angle to the leading section 26 of the movable airfoil portion 21a in the open position of the fan blade. This pivoting action of the forward section 26 provides a more efficient airfoil shape and thus more lift to each of the fan blades. When the shaft 23 is rotated in the opposite direction to return the movable airfoil portion to the sealed position, or the closed position of the fan blade 17 (see FIG. 4A), the leading section 26 is brought back into substantial alignment with the remainder of the airfoil portion 27 (see pivot arrows $P_1$).

Figures 9, 10:
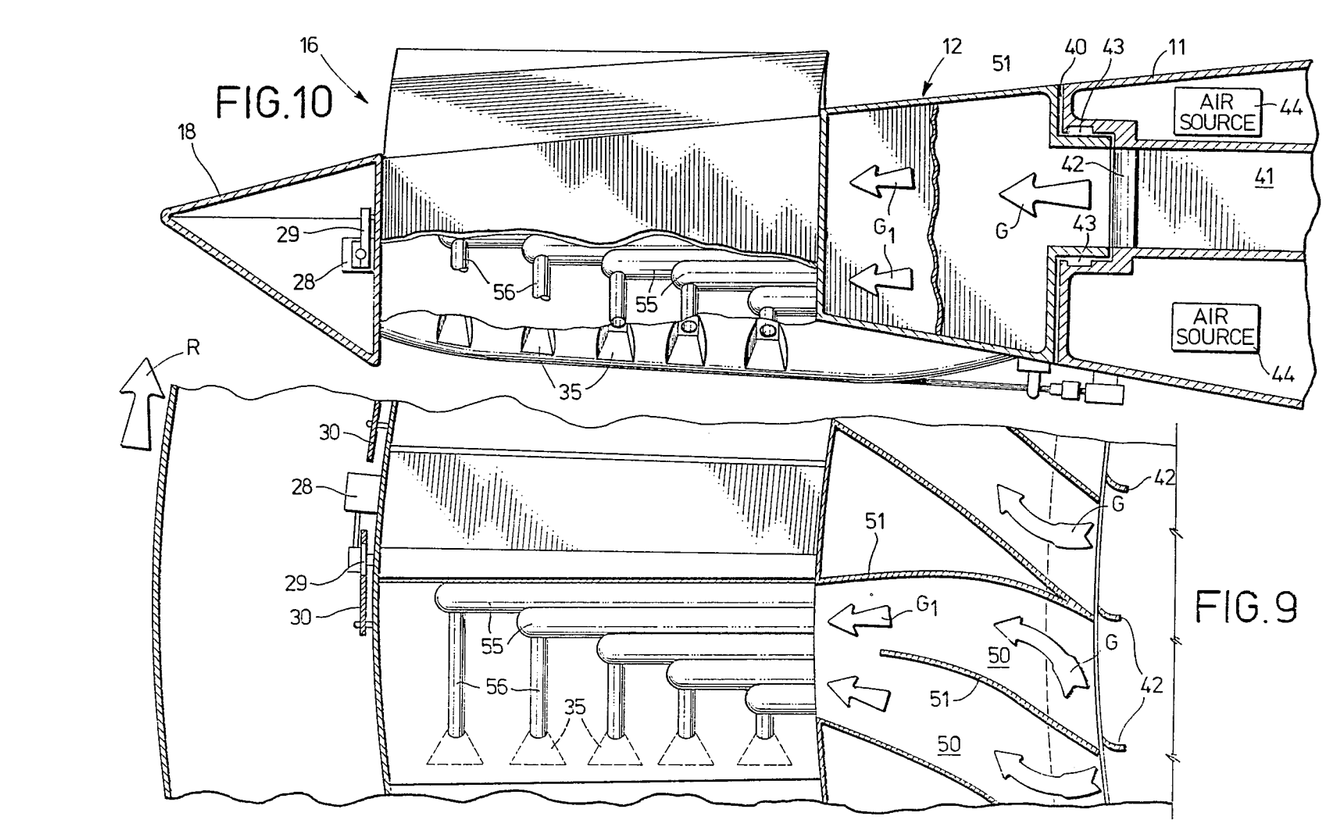
FIG. 9 is an enlarged partial cross-sectional view taken along a substantially horizontal plane through the rotor.
FIG. 10 is an enlarged cross-sectional view taken along a substantially vertical plane of the rotor.

Advantageously, in order to further improve the aerodynamics of the fan blades 17, the trailing section 27 is designed to mate with a recess in the upper surface of the stationary flap portion 20 (compare FIGS. 4A and 5A). The pivoting action P, $P_1$ is caused by a suitable hydraulic or electrical actuator 28 moving a lever 29 for closing/opening action (see FIGS. 4A and 5A, respectively). As best shown in FIG. 10, the fan blade actuator 28 is preferably mounted in the outer ring 18. The actuators 28 may be provided individually for the fan blades 17, or several blades can be operated from a single actuator. In either case, the operation of the blades are synchronized by a circular connector, such as a cable 30, shown in FIG. 9, but broken away for clarity.

Formed in the trailing edge of each of the stationary flap portions 20 of the fan blades 17, is a plurality of thrust nozzles 35 (note in particular FIGS. 4, 4A, 5, 5A). It is the hot exhaust gases from the jet engines 13–15 redirected through the aircraft 10 that are emitted from the nozzles 35 to provide the driving force for the fan assembly 16 causing the rotation R. As will be realized, the substantial volume of hot gases from the engines is divided substantially equally among the array of nozzles 35 on each blade 17 and of course divided by the number of blades. With this in mind, it can be recognized that a substantial rotating force for turning the rotor 12 of the aircraft 10 is generated, but that the concentrated thrust from any one individual nozzle 35 is minimized. With the lift being generated by the fan action and the thrust from the hot gases being dispersed over the large number of nozzles 35, the aircraft 10 of the present invention is much less susceptible to foreign object damage and the other shortcomings of the same type generally experienced by previous HSVTOL designs, as described above. However, the upward lift due to the thrust of the hot gases being emitted from the nozzles 35 is successfully utilized in attitude control of the aircraft, as will be explained in more detail below.

A labyrinth interface 40 is formed between the disk-shaped body 11 and the rotor 12, as best shown in FIG. 10 of the drawings. The hot exhaust gases from the engines 13-15 is flowing from a circular plenum 41 at this point around an annular opening that is defined by a plurality of stator blades 42. If necessary, a combined inflatable O-ring seal/air bearing 43 may be included at the interface 40 supplied by a suitable air source 44. As shown in FIG. 10, upper and lower seal/air bearing combination may be provided.

The fan assembly 16 is connected to the plenum 41 by converging transfer ducts 50 formed by curved vanes 51 (see FIGS. 9 and 10). Thus, these converging ducts 50 positioned just upstream of the fan assembly 16 receive and direct the hot exhaust gases from the plenum 41 and into the stationary flap portion of the individual blades 17 (note gas flow arrows G, $G_1$ in FIGS. 9 and 10). The hot exhaust gases then enter a plurality of progressive length feed tubes 55 extending transversely across the flap portion 20 of the blades. Each of the feed tubes 55 is connected to the respective nozzles 35 through outlet tubes 56 (see primarily FIGS. 4A, 5A, 9 and 10).

Figures 6, 11, 12, 12A, 13, 13A:
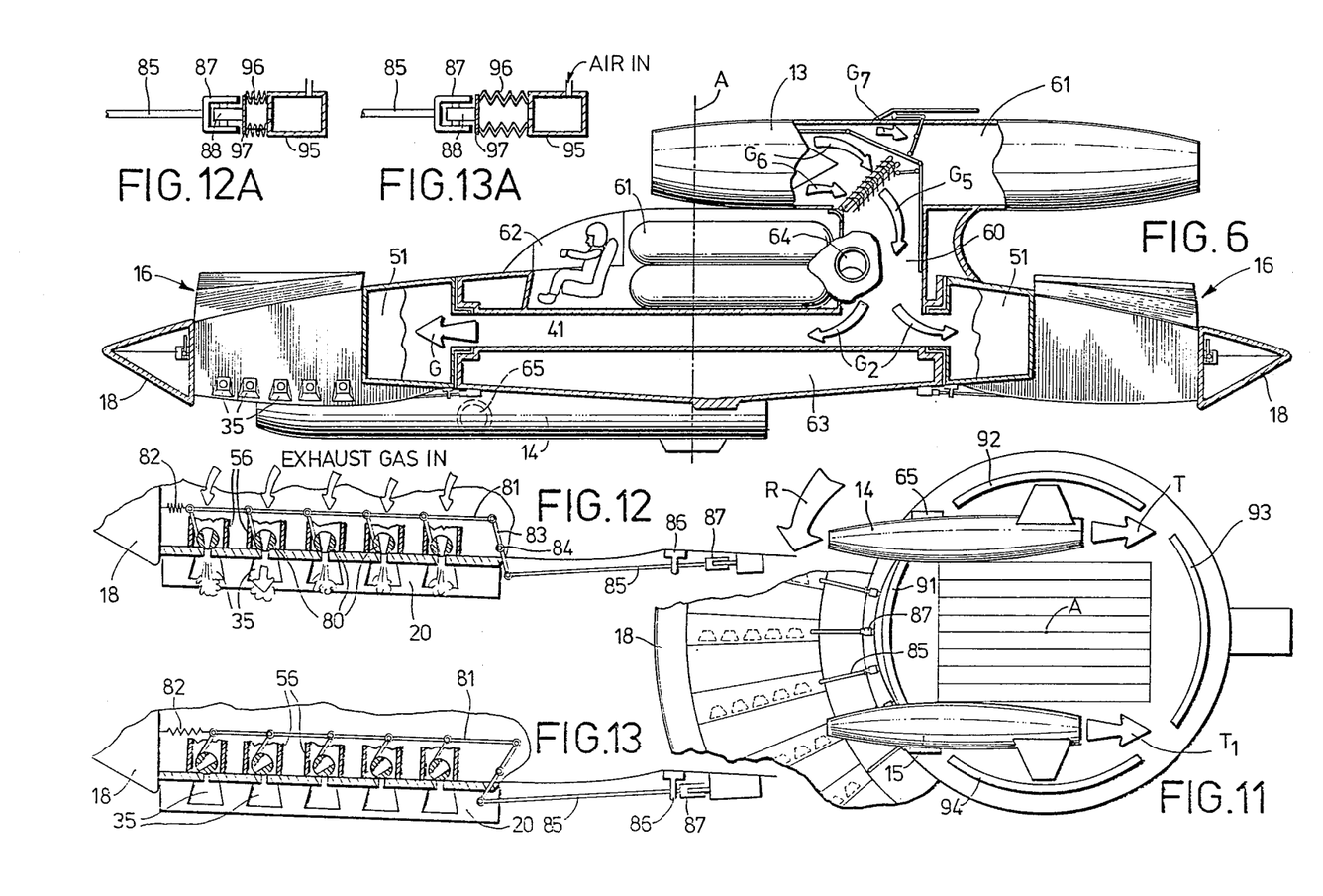
FIG. 6 is a side view of the aircraft partially in cross-section showing the body in the center and the rotor with the fan assembly around the outer perimeter with the fan blades in the open position.
FIG. 11 is a bottom view of the aircraft showing a partial section only of the rotor and the positioning of the cams for cyclically controlling the hot gas ejection from the nozzles.
FIG. 12 is a cut-away sectional view showing the eyeball valves for controlling the ejection from the nozzles and the control linkage.
FIG. 12A is an enlarged cross-sectional view of the control cam to position the valves in the open mode.
FIG. 13 is a partial cut-away view showing the eyeball valves in the position for cutting off the flow of exhaust gases.
FIG. 13A is an enlarged cross-sectional view of the cam with the cam plate extended to effect the cut off of the eyeball valves.

The hot exhaust gases G are supplied to the plenum 41 through a feed duct 60 extending from the jet engine 13, as best shown in FIG. 6 of the drawings. The feed duct 60 that extends from the exhaust nozzle 61 of the engine 13 to the plenum 41 redirects the exhaust gases, as shown by the gas flow arrows $G_2$. Immediately forward of the feed duct 60, fuel tanks 61 are shown; and immediately forward of these is cockpit 62 for the pilot. The main payload area 63 is positioned beneath the disk-shaped plenum 41.

If found necessary or desirable, a reaction jet port 64 may be provided in communication with the feed duct 60 to provide thrust counterbalancing of the rotational effect of the rotor 16. Additional jet ports, such as jet port 65 in the exhaust nozzle of the jet engine 14 may be provided as necessary (see FIG. 11). The jet engines 14, 15 can also be operated with differential thrust from their respective exhaust nozzles in order to provide some counterbalancing, as shown by thrust arrows T, $T_1$ in FIG. 11.

With reference to FIGS. 7 and 8 of the drawings, a fuller understanding of the redirection of the hot control gases to the plenum 41 for feeding the thrust nozzles 35 can be more fully understood. As previously explained, the feed duct 60 supplies the exhaust gas into the plenum 41, as shown by the arrows $G_2$ (see FIG. 6). It is noted that the additional jet engines 14, 15 also include feed ducts extending into the disk-shaped body 11 in the same manner as feed duct 60; however, for simplicity of the description these additional ducts have not been illustrated. Extending down into feed duct 60 is a main bypass door 70 which is slidable along a suitable track along the rear face of said duct. When the door 70 is withdrawn into the duct 60, the exhaust nozzle 61 of the jet engine 13 is fully open and the hot exhaust gas can flow directly out of the engine to provide thrust for the aircraft 10 in the cruise mode (see exhaust gas arrow $G_3$ in FIG. 7). During the cruise mode some hot exhaust gas is supplied into the feed duct 60 as shown by the smaller gas flow arrow $G_4$ (FIG. 7). The exhaust gas flow $G_4$ is sufficient to maintain the rotation of the fan assembly 16, at a reduced speed, to provide continuous gyroscopic stability to the aircraft in the cruise mode. As will be further explained below, this gyroscopic action even during horizontal flight does, in addition to providing stability, allow for attitude control of the aircraft.

With reference to FIG. 8, when the aircraft is ready for vertical flight, either during transition from the cruise mode or horizontal flight to the landing mode or for take-off, the main bypass door 70 is first raised to block a portion of the passage of the exhaust nozzle 61. The bypass door 70 is raised by a suitable main bypass actuator 71. As shown in FIG. 8, approximately 60 percent of the exhaust nozzle 61 is blocked by the main bypass door 70. In the transition mode from horizontal flight, the main bypass door is raised first and as will be realized this leaves approximately 40 percent of the nozzle open for continued forward thrust. In this manner, the aircraft can be slowed and then brought into a hover or vertical flight mode in a very efficient manner.

In order to best provide redirection of the hot exhaust gases into the feed duct 60 just upstream of the main bypass door 70, there is provided a gang of turning vanes 72 mounted on a movable support frame 73. The frame is supported at the lower end by a pivot 74 and is connected to move with the bypass door 70 by a single pivoted link 75 (see FIG. 8).

The remaining 40 percent of the exhaust nozzle 61 is adapted to be blocked by control bypass door 76 in response to control bypass actuator 77 operating elbow linkage 78 (see FIG. 8). In operation, with the control bypass door 76 and the main bypass door 70 closed, as shown, substantially all of the hot exhaust gas is directed into the feed duct 60 for transfer to the nozzles 35 where it can then be used for spinning of the rotor 12 and converted into vertical lift. As shown in FIG. 6, this exhaust gas is shown by flow arrow $G_5$. Exhaust gas $G_6$, just upstream of the turning vanes 35 includes all of the output of the engine 13 except for a small amount $G_7$ entering the exhaust nozzle 61 to assist in maintaining stability of the craft.

It is to be understood that the hot exhaust gas flow from the jet engines 14, 15 to supplement that shown with respect to jet engine 13 is substantially the same and thus need not be described in detail. The feed ducts from these two additional engines would feed into the plenum 41 and supply additional rotational power to the rotor 12 providing the substantial vertical lift that characterizes the aircraft 10 of the present invention. Significantly, the jet engines 13-15 do not have to be oversized thus providing significant weight savings and more efficient hovercraft operation.

As previously indicated, the primary function of the nozzles 35 ejecting the hot exhaust gases is to spin the rotor 12 providing lift to the aircraft 10 by the air flow $F_1$ across the airfoil portions 21 of the fan blades 17 (see FIG. 5A). In addition to providing the spinning thrust for the rotor 12, there is also some upward lift provided by the reaction force of the escaping exhaust gas. Assuming that the stationary flap portion 20 is extending at a 30-degree angle from the horizontal, in addition to the thrust providing the rotation R (see FIG. 5A) the exhaust gases from the nozzles 35 provide an upward reaction lift component C (see FIG. 5A also). This lift component C is significant in providing attitude control of the aircraft by varying the exhaust gas being emitted from one or more of the arrays of nozzles 35 on the blades 17. The manner in which this control is effected, will now be described in detail.

As best shown in FIGS. 12 and 13, the array of nozzles 35 extending along the trailing edge of the stationary flap portion 20 includes a corresponding plurality of eyeball valves 80, suitably mounted in the base of the outlet tubes 56. Each of the valves 80 is gang coupled to an operating linkage 81 including a tension spring 82 tending to force the valves 80 to the open position, as shown in FIG. 12. The operating linkage 81 is shifted by a crank lever 83 pivoted at point 84. An actuator rod 85 slidable in a suitable guide 86 carries a cam follower 87 on its distal end. As shown in FIG. 12A, the cam follower includes a roller 88 or other suitable element to engage the cam operator.

As will be clear, each of the eyeball valves 80 remains open under normal conditions unless the actuator rod 85 is shifted in the guide 86 (to the left in FIG. 12). Thus, unless some control is required, during vertical flight the maximum lift force is available around the full periphery of the aircraft. The spinning rotor 12 provides gyroscopic stabilization tending to keep the aircraft level at all times. Those attitude changes that must be made during the flight are uniquely carried out in accordance with the present invention by the mounting of four cams, one in each quadrant of the aircraft, and illustrated in FIG. 11 on the bottom view of the aircraft. Cam 91 is on the forward quadrant; cam 92 is on the left side quadrant; cam 93 is on the rear or aft quadrant; and cam 94 is on the right quadrant. As shown in this bottom view, the direction of rotation R is still assumed to be in the clockwise direction.

For illustrative purposes, the cams 91-94 include a hollow cam body 95 for receiving compressed air from the air source 44. An expansable chamber is formed along the outer perimeter of the body 95 by a bellows 96 supporting a cam plate 97 that engages the roller 88. In order to provide the eyeball valves 80 in the open position, the cam plate 97 is retracted, as shown in FIG. 12A, and the full thrust of the escaping exhaust gases is realized on each of the fan blades 17 in that particular quadrant. As shown in FIG. 11, the fan blades 17 in the right, left and rear quadrants, where the cams 92, 94 and 93, respectively, are not actuated, the full reaction thrust and lift component C (see FIG. 5A) is realized.

However, the cam 91 along the forward quadrant is actuated by entry of compressed air into the body 95 and expanding the bellows 96 to project the cam plate 97 in the outward direction against the cam follower 87 and roller 88. The rod 85 is thus shifted against the spring 82 causing the valves 80 to close, as shown in FIG. 13. When this occurs, the lift component C is reduced along the leading edge of the aircraft. In accordance with gyroscopic control principles, this reduction in lift causes a shifting of the aircraft at a position 90 degrees from the correction. In FIG. 11, remembering that this is a bottom view and that the rotation R is in the clockwise direction, the axis A of the aircraft is induced by gyroscopic precession to shift so that the left side of the aircraft is subject to a lift force. Thus, during operation, if a roll correction is required to raise the left side of the aircraft, then through gyroscopic control the cam 91 is actuated, reducing the reaction lift along the leading edge of the aircraft and providing the corrective action as desired. The reaction thrust from the nozzles 35 is designed to assure sufficient differential thrust to gyroscopically control the attitude of the aircraft by induced precession of the axis A. Pitch is controlled in a similar manner by operating one of the cams 92, 94.

Figure 14:
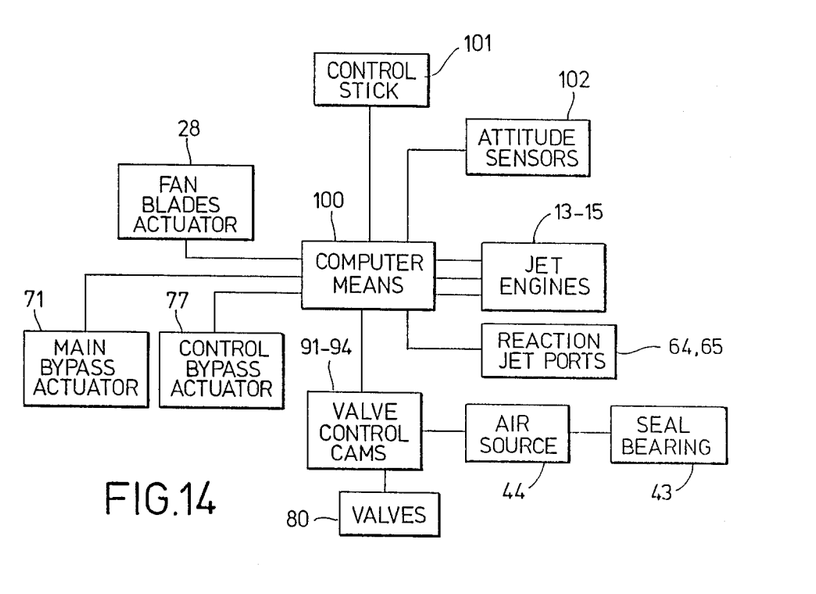
FIG. 14 is a schematic diagram in block form showing the control system of the aircraft of the present invention.

Under operational conditions of the aircraft 10, a computer means 100 is employed to control the cams 91-94 and thus operate the valves 80, cyclically in the proper manner (see the schematic diagram in FIG. 14). The pilot provides the input to the computer 100 through a control stick 101 so that the aircraft 10 can also be maneuvered by actuation of the cams 91-94 to thus give the proper attitude change. The computer means 100 is designed to maintain the stability of the aircraft by making automatic changes in response to strategically located attitude sensors 102. The manner in which the computer means 100 also controls the jet engines 13-15, the reaction jet ports 64, 65, the actuators 71, 77 for the bypass doors and the fan blades actuator 28 is also shown in FIG. 14.

From the foregoing description of my invention, it will be realized that significant advantages flow from the design of the aircraft 10. With substantially less bulk and weight, and with significantly less power requirement, the aircraft is capable of pure vertical flight, as well as horizontal flight that may be high speed, and even supersonic, if desired. The lift during vertical flight is provided by rotation of the rotor 12 including the fan assembly 16. The blades 17 are opened to scoop ambient air in between the adjacent blades and provide downwash under the aircraft and lift as the air flows over the airfoil portion 26, 21a and 21 of the blades 17. The hot exhaust gases are directed from an array of nozzles 35 on the trailing edge of each stationary flap portion 20 of the blades 17 (see FIGS. 4A and 5A). The hot exhaust gases are provided through a unique system including a feed duct 60, a plenum 41 and passages within the rotor 12 (see FIG. 6). The bypass doors 70, 76 may be operated in a unique manner in order to drive the fan assembly 16 when required and then provide maximum forward thrust when horizontal flight is desired. The arrangement provides for a smooth transition through sequential operation of the doors 70, 76 that each block a portion of exhaust nozzle 61 of the engine 13. Because of the absence of high intensity, direct exhaust extending downwardly into the landing area, the aircraft is significantly more stable and the problem of foreign object damage and such down of the aircraft are minimized.

Control of the attitude of the aircraft is by cyclic control of the reaction thrust being emitted from the nozzles 35 in response to the cams 91-94 positioned in the quadrants of the aircraft (see FIG. 11). The computer means 100 processes the signals from the control stick 101 as well as from attitude sensors 102 positioned on the aircraft in order to provide the desired more efficient control. The end result is not only a highly stable aircraft 10, but also one that is characterized by superior maneuverability.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention. Utilization can be in various embodiments and with various modifications as are suited to the particular use contemplated. It is intended that the scope of the invention be defined by the claims appended hereto.

I claim:

1. A high-speed vertical take-off and land aircraft comprising:
   a disk-shaped body;
   a jet engine including an exhaust nozzle mounted on said body;
   duct means for receiving and redirecting the hot exhaust gases from the jet engine;
   an annular rotor having a rotatable fan assembly concentric with the body;
   said fan assembly including a plurality of blades to provide vertical lift for said aircraft; said blades being airfoil-shaped and operative to scoop ambient air causing a downwash to maximize the lifting forces;
   passage means in said blades for receiving the hot exhaust gases from said duct means; and
   nozzle means connected to said passage means located on said blades to eject said exhaust gases to provide rotation to said fan assembly; whereby primary lift for the aircraft is provided by lift forces on said blades upon rotation of said fan assembly.

2. The high-speed vertical take-off and land aircraft of claim 1, wherein said blades include a movable airfoil portion; and means for moving said airfoil portion to open the fan blades to scoop air and provide lift over the upper surface of said airfoil portion and also to close the blades and allow low drag, horizontal flight.

3. The high-speed vertical take-off and land aircraft of claim 2, further comprising:
   fixed flap portions extending downwardly to provide the downwash of air and the lift of the aircraft in vertical flight; said nozzle means including a plurality of nozzles formed on the trailing edge of said flap portion.

4. The high-speed vertical take-off and land aircraft of claim 1, wherein said duct means includes a feed duct extending from the jet engine to receive substantially all of the exhaust gas from the exhaust nozzle of the jet engine;
   plenum means for receiving the gas from the feed duct; and seal/bearing means between said plenum and the rotatable fan assembly to allow efficient transfer of the exhaust gas to the nozzle means.

5. The high-speed vertical take-off and land aircraft of claim 4, wherein said annular rotor includes transfer ducts for feeding said exhaust gas to the passage means in said blades and ejection of exhaust gases from said nozzle means.

6. The high-speed vertical take-off and land aircraft of claim 5, wherein said nozzle means includes a plurality of nozzles on the trailing edge of each of said blades, passage means in said blades formed by a series of progressively elongated feed tubes; outlet tubes connected to said feed tubes to provide the exhaust gases to respective nozzles.

7. The high-speed vertical take-off and land aircraft of claim 1, wherein is provided valve means in said passage means for controlling the flow of exhaust gases from the nozzles.

8. The high-speed vertical take-off and land aircraft of claim 1, wherein said duct means for directing the exhaust gases comprises
   a feed duct extending from the jet engine;
   bypass door means in said jet engine for closing the exhaust nozzle and directing the flow to said feed duct;
   actuator means for moving said bypass door means; and
   turning vane means adjacent said bypass door means for redirecting the gas into the feed duct.

9. The high-speed vertical take-off and land aircraft of claim 8, wherein said bypass door means includes a main bypass door to block at least a portion of the flow from the engine exhaust nozzle; a separate control bypass door to block an additional portion of the flow from the engine; and actuator means for separately moving said bypass doors, whereby the bypass of hot gases can be made progressive for transition between vertical and horizontal flight.

10. A high-speed vertical take-off and land aircraft comprising:
    a disk-shaped body;
    a jet engine on said body; a rotor extending around the periphery of the body;
    a fan assembly including a plurality of fan blades on said rotor for providing downwash of ambient air providing lift to the aircraft;
    nozzle means in said blades to provide turning of the rotor;
    duct means for feeding hot exhaust gases from said jet engine to said nozzle means;
    valve means for selectively regulating the flow of exhaust gases from said nozzle means; means to provide a differential thrust on opposite sides of the aircraft;
    said flow providing sufficient differential thrust to gyroscopically control the attitude of said aircraft by induced precession of the axis of the aircraft.

11. The high-speed vertical take-off and land aircraft of claim 10, wherein said nozzle means includes a plurality of nozzles on the trailing edge of said fan blades; and
    said valve means includes a valve for each of said nozzles; and means for actuating said valves together to provide exhaust gases from said nozzles.

12. The high-speed vertical take-off and land aircraft of claim 11, wherein said actuating means includes a cam extending around substantially a quadrant of the perimeter of said body;
    means for varying the cam plate of said cam to operate said valves;
    whereby the differential thrust provided by activation of a quadrant cam provides gyroscopic precession of the axis of the aircraft and control of the attitude thereof.

13. The high-speed vertical take-off and land aircraft of claim 12, wherein each of said cams includes a hollow cam body; a bellows extending along one side of said cam body and forming an expansible chamber;
    a cam plate extending along the free side of said bellows;

and means for pressurizing the cam body and said bellows to position the cam plate for actuation of said nozzles;

a cam follower engaging the cam plate and connected to operating linkage with said valves;

whereby the thrust from said nozzles is varied in accordance with the extension of said cam plate from said cam body to vary the attitude of the aircraft.

14. A high-speed vertical take-off and land aircraft comprising:

a disk-shaped body;

a jet engine mounted on said body;

duct means for receiving and redirecting the hot exhaust gases from the jet engine;

an annular rotor having a rotatable fan assembly concentric with the body, said rotor including inner converging transfer ducts for the exhaust gases, an outer ring on the opposite side of said rotatable fan assembly, and actuator means in said outer ring for changing the pitch of the fan blades to modulate the vertical lift;

said fan assembly including a plurality of blades to provide vertical lift for said aircraft; said blades being airfoil-shaped and operative to scoop ambient air causing a downwash to maximize the lifting forces;

passage means in said blades for receiving the hot exhaust gases from said duct means;

nozzle means connected to said passage means located on said blades to eject said exhaust gases to provide rotation to said fan assembly; whereby primary lift for the aircraft is provided by lift forces on said blades upon rotation of said fan assembly.

15. The high-speed vertical take-off and land aircraft of claim 14, wherein is further provided valve means for controlling the ejection of exhaust gases from each nozzle; and actuator means for cyclically operating the valves at selected positions around the periphery of the disk-shaped body.

* * * * *